United States Patent
Uemura et al.

(10) Patent No.: US 10,635,016 B2
(45) Date of Patent: Apr. 28, 2020

(54) PRINT HEAD AND IMAGE FORMING DEVICE HAVING THE SAME

(71) Applicant: KONICA MINOLTA, INC., Chiyoda-ku, Tokyo (JP)

(72) Inventors: Takaki Uemura, Seto (JP); Makoto Obayashi, Toyokawa (JP); Masayuki Iijima, Okazaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/115,843

(22) Filed: Aug. 29, 2018

(65) Prior Publication Data
US 2019/0079428 A1 Mar. 14, 2019

(30) Foreign Application Priority Data

Sep. 11, 2017 (JP) ................. 2017-174273

(51) Int. Cl.
*G03G 15/043* (2006.01)
*G03G 15/04* (2006.01)
(Continued)

(52) U.S. Cl.
CPC ..... *G03G 15/043* (2013.01); *G03G 15/04036* (2013.01); *G03G 15/04054* (2013.01);
(Continued)

(58) Field of Classification Search
CPC ....... G03G 15/04054; G03G 15/04036; G03G 15/043; G03G 15/326; G03G 15/0409; G02B 5/005
See application file for complete search history.

(56) References Cited

U.S. PATENT DOCUMENTS

| 5,959,654 A | 9/1999 | Futoshi |
| 2005/0116980 A1* | 6/2005 | Nakahanada ......... B41J 29/393 347/19 |

(Continued)

FOREIGN PATENT DOCUMENTS

| JP | 58-202438 | 11/1983 |
| JP | 2008-152040 A | 7/2008 |

(Continued)

OTHER PUBLICATIONS

Search Report issued in European Patent Application No. 18188774-1022, dated Jan. 3, 2019 (6 pages).

*Primary Examiner* — Ryan D Walsh
(74) *Attorney, Agent, or Firm* — Buchanan Ingersoll & Rooney PC

(57) ABSTRACT

A print head for writing data onto a photoreceptor, including a light source panel of light emitting elements arranged in a matrix, optical systems arranged in a matching matrix, light receiving elements, and a corrector. The optical systems each include at least a light-source-side lens and an image-side lens, and focus light from the light emitting elements onto different regions of the photoreceptor. The light receiving elements each include a light receiving surface disposed in a leaked light region and detect light incident on the light receiving surface. The leaked light region is in a gap between the light-source-side lens and the image-side lens of each of the optical systems occupied by optical paths of light transmitted through the light-source-side lenses but not incident on the image-side lenses. The corrector corrects amounts of light to be emitted from the light emitting elements based on the light detected.

9 Claims, 5 Drawing Sheets

(51) Int. Cl.
*G03G 15/32* (2006.01)
*G02B 5/00* (2006.01)

(52) U.S. Cl.
CPC ........... *G03G 15/326* (2013.01); *G02B 5/005* (2013.01); *G03G 15/0409* (2013.01)

(56) References Cited

U.S. PATENT DOCUMENTS

2013/0286141 A1\* 10/2013 Iwamoto ............ G03G 15/0435
 347/224
2017/0115592 A1\* 4/2017 Yano ................ G03G 15/04063

FOREIGN PATENT DOCUMENTS

| JP | 2008-221807 A | 9/2008 |
|----|---------------|--------|
| JP | 2009-023261   | 2/2009 |
| JP | 201-179464 A  | 8/2010 |
| JP | 2012-101434 A | 5/2012 |
| JP | 2014-172384 A | 9/2014 |

\* cited by examiner

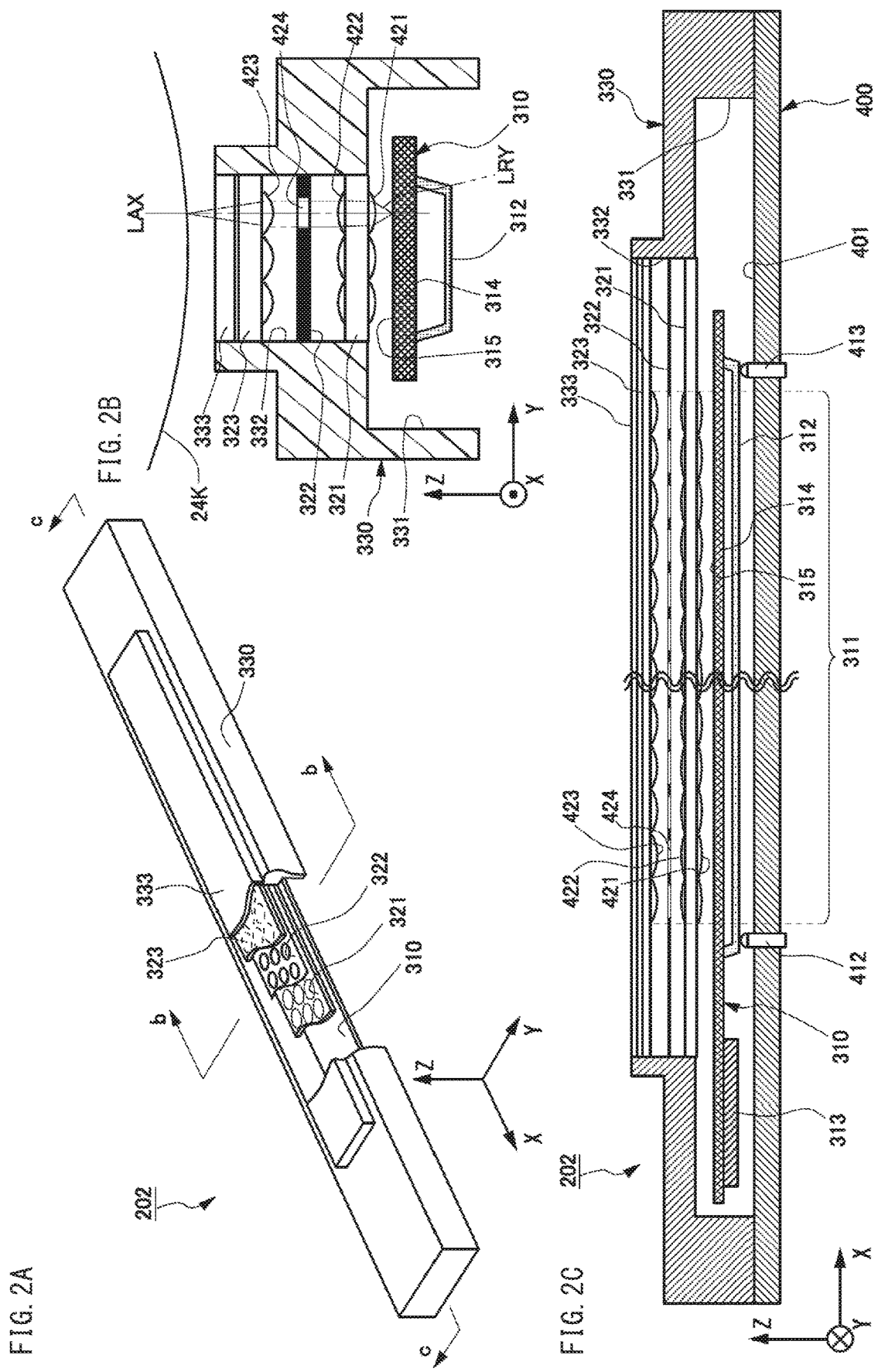

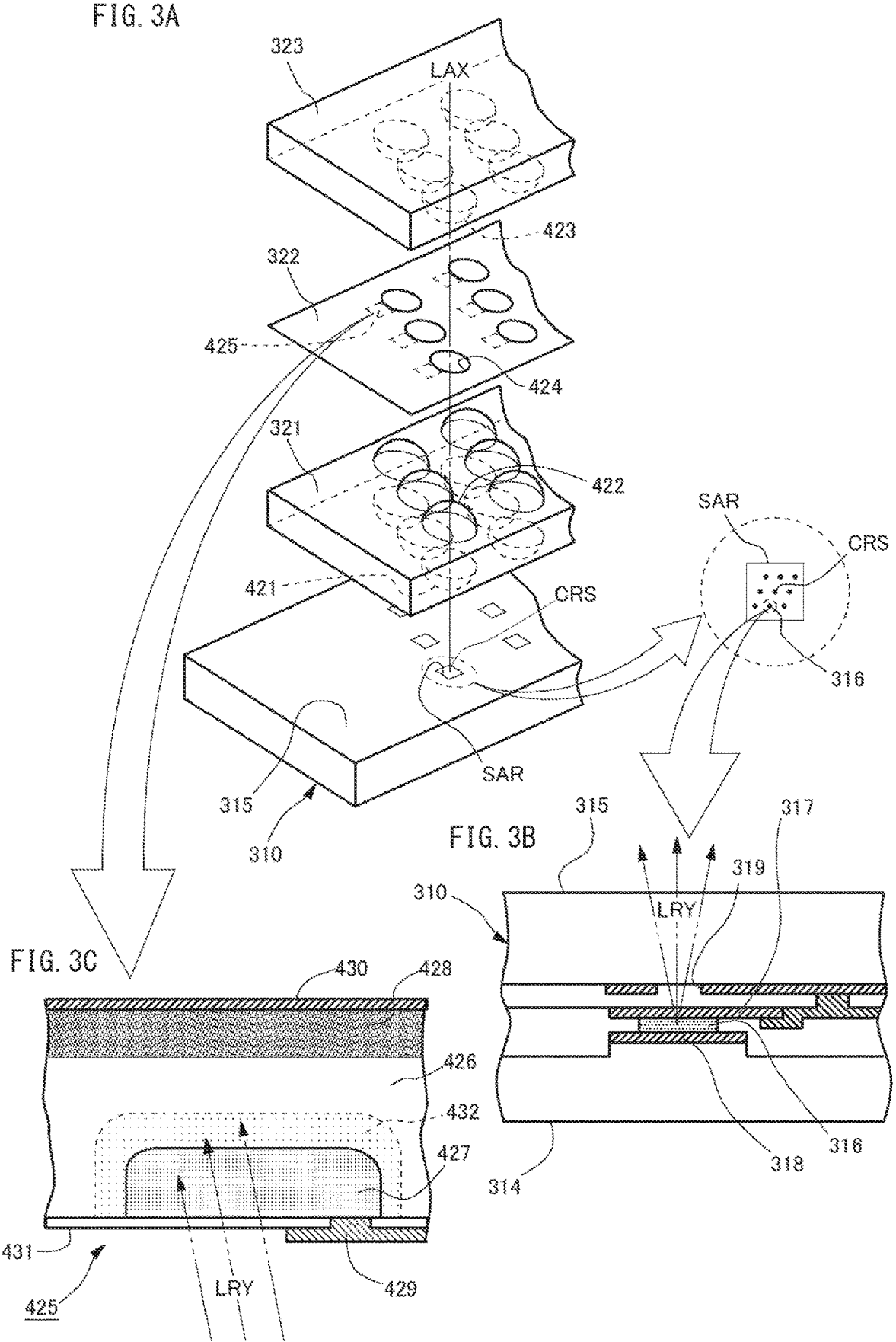

PRINT HEAD AND IMAGE FORMING DEVICE HAVING THE SAME

This application claims priority to Japanese Patent Application No. 2017-174273, filed Sep. 11, 2017, the contents of which are hereby incorporated herein by reference in their entirety.

BACKGROUND

Technical Field

The present disclosure relates to electrophotographic image forming devices, and in particular to print heads that expose photoreceptors to light modulated according to image data.

Description of the Related Art

A print head (PH) exposes a photoreceptor surface to light in an electrophotographic image forming device such as a printer or copying machine, or in other words irradiates a charged region of a photoreceptor surface with light modulated according to image data to form a charge distribution corresponding to variation in light irradiation, i.e., an electrostatic latent image. The photoreceptor covers an outer circumferential surface of a rotating body such as a drum or a belt rotatably supported in the image forming device. The print head exposes the photoreceptor surface to light one line-shaped region (hereinafter also referred to as a "line") at a time, each line extending in an axial direction of the rotating body (hereinafter also referred to as a "main scanning direction"). By repeatedly exposing lines as the photoreceptor rotates, a plurality of exposed lines are continuous in the rotation direction (hereinafter also referred to as a "sub-scanning direction") on the photoreceptor surface and thus the electrostatic latent image extends two-dimensionally.

A print head of a light-emitting-element-array type uses an array of light emitting elements, such as light emitting diodes (LEDs) or semiconductor lasers, and a microlens array (MLA) extending in the main scanning direction, in order to simultaneously expose the entirety of one line of the photoreceptor surface (see JP 2010-179464, JP 2014-172384, JP 2008-152040, JP 2008-221807, JP 2012-101434). Accordingly, unlike optical scanning types of print head, which use deflectors such as polygon mirrors to continuously scan one line on the photoreceptor surface with laser light while periodically deflecting the laser light, light-emitting-element-array types of print head produce no noise caused by a deflector and have shorter optical path lengths from light emitting elements to the photoreceptor. In other words, light-emitting-element-array types of print head have advantages over optical scanning types in terms of noise reduction and miniaturization. It is accordingly expected that light-emitting-element-array types of print head are effective in furthering dissemination of image forming devices, particularly in offices and homes.

On the other hand, light-emitting-element-array types of print head may have variations (individual differences) in structure and (initial) properties between light emitting elements, which may cause differences in light emission amounts with respect to a constant current. In other words, uneven amounts of light may be emitted, and there is therefore a risk of uneven exposure along a line of the photoreceptor surface. Accordingly, correction to compensate for uneven light amounts is required to improve image quality. As a technique for implementing such correction, light emission amount feedback control is known (see JP 2010-179464). For example, a print head (exposure head) described in JP 2010-179464 performs a feedback control using a light receiving element (photo sensor) in calibrating light emission amounts. The light receiving element is disposed beside the microlens opposite a substrate on which a light emitting element array is mounted, and detects and measures a portion of leaked light that deviates outside the microlens from light emitted from light emitting elements. Based on a light amount indicated by this measurement, a total amount of light emitted from the light emitting elements is estimated, and from a difference between this estimated value and a target value, a correction ratio (gain) of a current applied to light emitting elements is updated. Such feedback control of light emission is performed periodically during a usage period of the print head. As a result, not only unevenness in light amount caused by initial variation in properties between light emitting elements, but also unevenness in light amount caused by variation in changes over time can be reduced.

SUMMARY

In recent years, demand for miniaturization and higher image quality with respect to image forming devices has further increased. Accordingly, higher performance is sought for print heads of the light-emitting-element-array type. As a means of meeting such demands, use of organic light-emitting diodes (OLEDs) as a light source is being considered. In comparison with LEDs, OLEDs are advantageous in having a low black level, high color expression, and low power consumption, and can easily be made compact, thin, and light. On the other hand, variation in structure and (initial) properties between light emitting elements is greater for OLEDs than LEDs. Further, OLEDs have a faster rate of light emission amount decrease (light amount deterioration) as cumulative total light emission time increases than LEDs. Speed of light amount deterioration varies depending on light emission amount and light emitting element temperature, and therefore differences occur in light amount deterioration due to differences in usage history even between light emitting elements having the same initial properties. Accordingly, particularly when using OLEDs as light sources, it is desirable that print heads, during usage, periodically repeat calibration of light emission amounts of light receiving elements.

However, there is a problem with light-emitting-element-array types of print head in that further improvement in accuracy of calibration of light emission amounts by using a light receiving element, i.e., further reduction of acceptable error between the estimated and target values of light emission amounts, is difficult for the following reasons. Variation in structure among light emitting elements is large, and therefore differences occur in optical path length to the light receiving element. These differences impart variation to values measured by the light receiving element even if light emission amounts are uniform between the light emitting elements, and impart error to estimated light emission amounts from the light emitting elements estimated from the measured values. If a difference between the estimated and target values of light emission amount exceeds an actual value of light emission due to the error, the correction ratio to the amount of current applied to the light emitting elements (gain) determined from the difference will exceed an actually required level. On the other hand, if the difference is less than the actual value, the gain does not reach an actually required level. Such errors in the gain destabilize feedback control of light emission amounts. In particular, when the target value of light emission amount is large, there is a risk that actual light emission amounts are saturated to an acceptable upper limit, and when the target value is small, there is a risk that the amounts of light reaching the light receiving element falls below an acceptable lower limit. In either case the light receiving element is unable to accurately measure the light amounts.

An object of the present invention is to solve the problems described above, and more particularly to provide a print head capable of further improving accuracy of calibration of light emission amounts by using a light receiving element, regardless of individual differences between light emitting elements.

A print head according to one aspect of the invention is a print head for writing data onto a photoreceptor by using modulated light. The print head includes a light source panel, an optical system array, and a driver. The light source panel includes light emitting elements arranged in a matrix. The optical system array is an aggregate of optical systems arranged in a matrix shape matched up with the matrix of the light emitting elements. The optical systems each include at least a light-source-side lens and an image-side lens, and focus light from the light emitting elements onto different regions of the photoreceptor. The driver modifies light emission amounts of each of the light emitting elements according to the data to be written and includes light receiving elements and a corrector. The light receiving elements each include a light receiving surface disposed in a leaked light region and detect an amount of light incident on the light receiving surface. The leaked light region is in a gap between the light-source-side lens and the image-side lens of each of the optical systems, and is occupied by optical paths of light transmitted through the light-source-side lens but not incident on the image-side lens. The corrector corrects the amounts of light to be emitted from the light emitting elements based on the amounts of light detected by the light receiving elements.

An image forming device according to one aspect of the invention includes a photoreceptor, the print head described above, which exposes a surface of the photoreceptor to a light beam to form an electrostatic latent image on the surface, a developer that develops the electrostatic latent image to a visible image by using toner, and a transfer device that transfers the visible image developed by the developer from the photoreceptor to a sheet.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the invention. In the drawings:

FIG. 2A is a perspective view of a print head illustrated in FIG. 1B and FIG. 1C; FIG. 2B is a cross section of the print head taken along straight line b-b indicated in FIG. 2A; and FIG. 2C is a cross section of the print head taken along straight line c-c indicated in FIG. 2A.

FIG. 3A is a partial exploded view of a light source panel and three arrays including optical system arrays illustrated in FIGS. 2A, 2B, and 2C; FIG. 3B is a partial cross section of a portion including one light emitting element in an element surface of the light source panel; and FIG. 3C is a cross section of a light receiving element illustrated in FIG. 3A.

DETAILED DESCRIPTION

The following is a description of one or more embodiments of the present invention with reference to the drawings. However, the scope of the invention is not limited to the embodiments described.

[Image Forming Device Appearance]

Figure 1A:
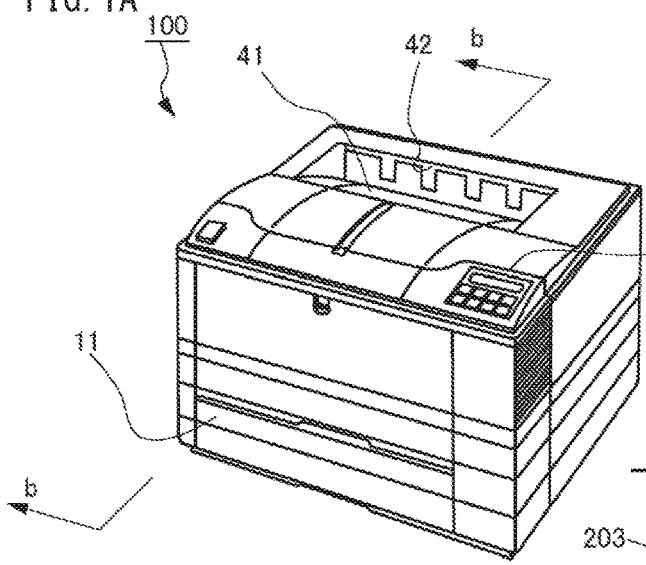
FIG. 1A is a perspective view illustrating appearance of an image forming device pertaining to an embodiment of the present invention.

FIG. 1A is a perspective view illustrating appearance of an image forming device 100 pertaining to an embodiment of the present invention. The image forming device 100 is a printer. A discharge tray 41 is provided on a top surface of a casing of the image forming device 100, and stores sheets discharged from a discharge opening 42 towards a rear of the image forming device 100. An operation panel 51 is embedded forward of the discharge tray 41. A paper feed cassette 11 is attached to a bottom portion of the printer 100 in a way that allows the paper feed cassette 11 to be pulled out.

[Internal Configuration of Printer]

Figure 1C:
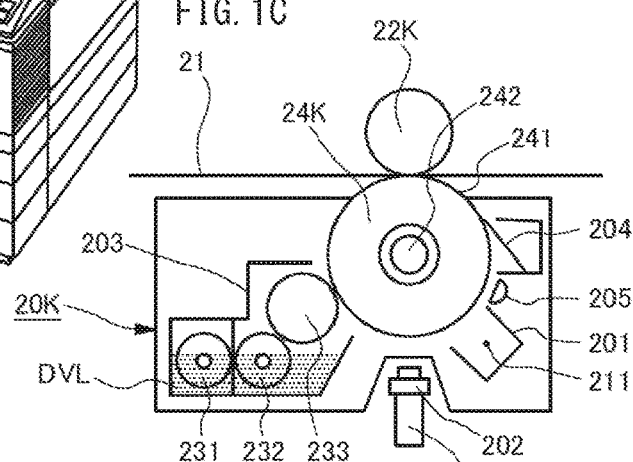
FIG. 1C is an enlargement diagram of one photoreceptor unit illustrated in FIG. 1B.
Figure 1B:
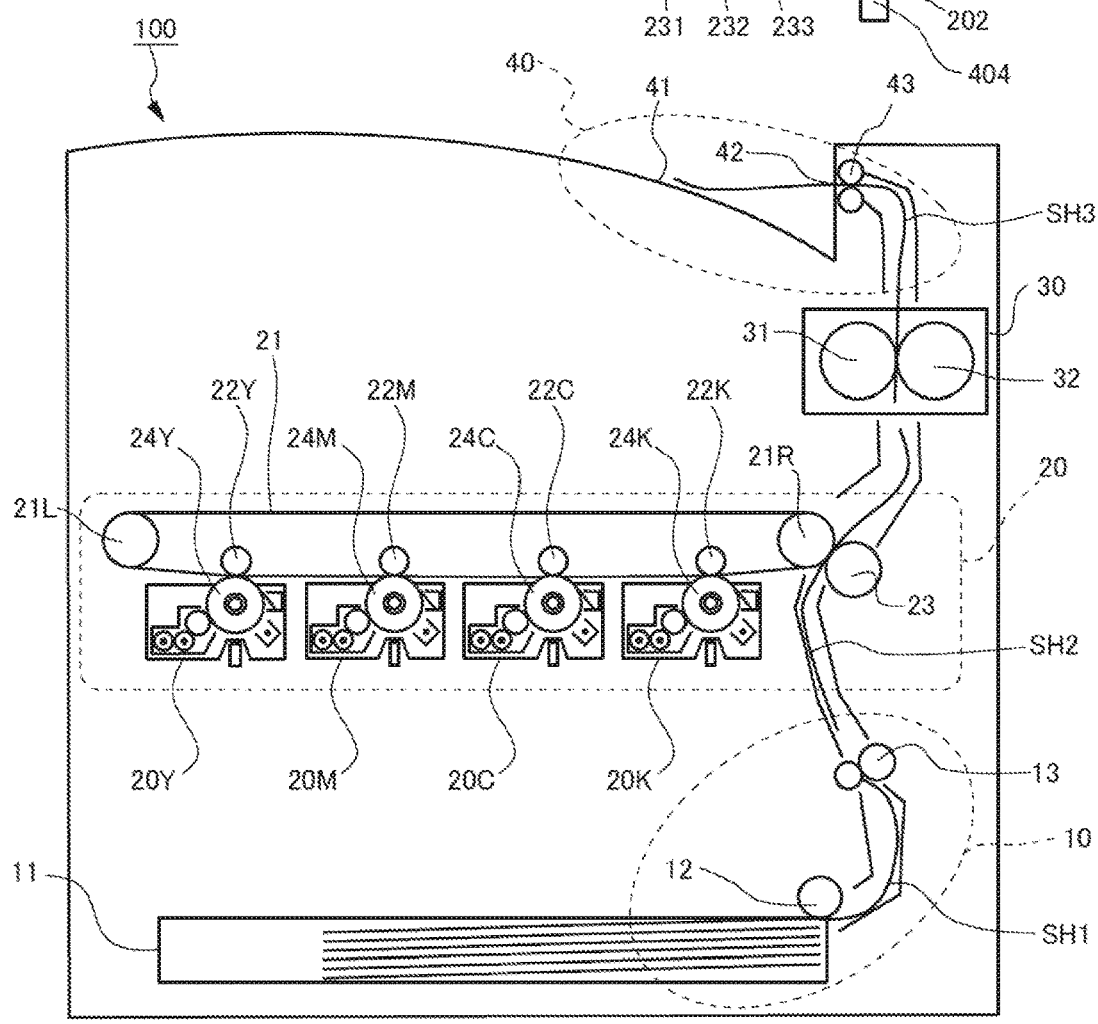
FIG. 1B is a schematic cross section of a printer taken along straight line b-b shown in FIG. 1A.

FIG. 1B is a schematic cross section of the printer 100 taken along the straight line b-b indicated in FIG. 1A. The printer 100 is an electrophotographic color printer, and includes a feeder unit 10, an imaging unit 20, a fixing unit 30, and a discharge unit 40.

The feeder unit 10 separates sheets SH1 one by one from a stack of sheets stored in the paper feed cassette 11 by using a pickup roller 12. Next, the feeder unit 10 sends a separated sheet to the imaging unit 20 by using a timing roller 13 synchronized with the pickup roller 12 action. Here, "sheet" means a thin film or thin plate-like material, article, or print matter made of paper or resin. Types of sheet or paper types that can be stored in the paper feed cassette 11 include plain, high quality, color printer, coated, and the like, and sizes of sheets include A3, A4, A5, B4, and the like. Further, sheets can be stored in a portrait or landscape orientation.

The imaging unit 20 is, for example, an intermediate transfer type of printing engine, and includes tandem photoreceptor units 20Y, 20M, 20C, 20K, an intermediate transfer belt 21, primary transfer rollers 22Y, 22M, 22C, 22K, and a secondary transfer roller 23. The intermediate transfer belt 21 is wrapped around a driven pulley 21L and a drive pulley 21R. Between the pulleys 21L, 21R, four photoreceptor units 20Y, 20M, 20C, 20K and four primary transfer rollers 22Y, 22M, 22C, 22K are arranged to form pairs sandwiching the intermediate transfer belt 21 therebetween. A nip is formed by the secondary transfer roller 23 and the drive pulley 21R, sandwiching the intermediate transfer belt 21 therebetween. A sheet SH2 delivered from the timing roller 13 is passed through the nip.

In the photoreceptor units 20Y, 20M, 20C, 20K, nips are formed by photoreceptor drums 24Y, 24M, 24C, 24K and the primary transfer rollers 22Y, 22M, 22C, 22K, sandwiching the intermediate transfer belt 21 therebetween. While the intermediate transfer belt 21 rotates (counterclockwise in FIG. 1B), as a surface portion of the intermediate transfer belt 21 passes through the nips between the primary transfer rollers 22Y, 22M, 22C, 22K and the photoreceptor drums 24Y, 24M, 24C, 24K, the photoreceptor units 20Y, 20M, 20C, 20K form yellow (Y), magenta (M), cyan (C), and black (K) single-color toner images on the surface portion. These four color toner images are superimposed on the surface portion to form one color toner image. At a timing coinciding with the color toner image passing through the nip between the drive pulley 21R and the secondary transfer roller 23, a sheet SH2 delivered from the timing roller 13 passes through the nip. Thus, the color toner image is transferred from the intermediate transfer belt 21 to the sheet SH2 at the nip.

The fixing unit 30 thermally fixes a toner image to a sheet SH3 delivered from the imaging unit 20. Specifically, the fixing unit 30 passes the sheet SH2 to a nip between a fixing roller 31 and a pressure roller 32 while the fixing roller 31 and the pressure roller 32 are rotated. At this time, the fixing roller 31 applies heat from a built-in heater to a surface of the sheet SH3 and the pressure roller 32 applies pressure to the heated portion of the sheet SH3 to press the heated portion against the fixing roller 31. Due to heat from the fixing roller 31 and pressure from the pressure roller 32, the toner image is fixed to the surface of the sheet SH3. The fixing unit 30, via rotation of the fixing roller 31 and the pressure roller 32, further delivers the sheet SH3 to the discharge unit 40.

The discharge unit 40 discharges the sheet SH3 on which the toner image is fixed from the discharge opening 42 to the discharge tray 41. More specifically, the discharge unit 40 uses discharge rollers 43 disposed inwards from the discharge opening 42 to convey the sheet SH3 from an upper portion of the fixing unit 30 to the discharge opening 42 and feed the sheet SH3 out of the discharge opening 42 to be stacked on the discharge tray 41.

[Configuration of Photoreceptor Unit and Image Forming Process]

FIG. 1C is an enlargement of the photoreceptor unit 20K illustrated in FIG. 1B. The photoreceptor unit 20K includes, in addition to the photoreceptor drum 24K, a charger 201, a print head 202, a developer 203, a cleaning blade 204, and an eraser 205, which are disposed around the photoreceptor drum 24K and perform charging, exposure, development, transfer, cleaning, and charge cancellation with respect to an outer circumferential surface of the photoreceptor drum 24K during electrophotographic image forming processing. The other photoreceptor units 20Y, 20M, 20C also have similar configurations.

The photoreceptor drum 24K is a cylindrical member made of a conductor such as aluminum whose outer circumferential surface 241 is covered with a photoreceptor. The photoreceptor drum 24K is rotatably supported around its central axis 242 (in FIG. 1C, an axis normal to the plane of the drawing, at a center of the circular cross section of the photoreceptor drum 24K). The photoreceptor is a material whose charge varies depending on light exposure, and includes an inorganic material such as amorphous selenium, selenium alloy, or amorphous silicon, or an organic photoconductor (OPC) of laminated organic materials. Although not illustrated in FIG. 1C, the central axis 242 of the photoreceptor drum 24K is connected to a drive motor via a torque transmission mechanism such as a gear, belt, or the like. When the photoreceptor drum 24K makes one rotation due to rotational drive from the drive motor (in the clockwise direction in FIG. 1C), each surface portion of the photoreceptor faces processing sections 201, 202, 203, 204, 205 in this order and undergoes the processing thereof.

The charger 201 includes an electrode 211 in a wire or thin plate shape extending in the axial direction at a distance from the outer circumferential surface 241 of the photoreceptor drum 24K. The charger 201 causes a corona discharge between the electrode 211 and the outer circumferential surface 241 of the photoreceptor drum 24K through application of a negative high voltage to the electrode 211, for example. The discharge negatively charges a surface portion of the photoreceptor facing the charger 201.

The print head 202 exposes a linear area extending in the axial direction (main scanning direction), i.e., one line, among charged portions of the photoreceptor drum 24K. At this time, print head 202 modulates amounts of light irradiating the photoreceptor drum 24K based on brightness indicated by image data. In one line on the photoreceptor drum 24K, the greater the amount of irradiated light the more the charge amount decreases, and therefore a charge amount distribution corresponding to a brightness distribution indicated by the image data is formed, i.e., an electrostatic latent image is formed. The print head 202 repeats this exposure operation for each line in synchronization with rotation of the photoreceptor drum 24K. As a result, a plurality of exposed lines are continuous along the rotation direction, i.e., the sub-scanning direction, of the outer circumferential surface of the photoreceptor drum 24K, and therefore an electrostatic latent image expands two dimensionally.

The developer 203 develops the electrostatic latent image on the photoreceptor drum 24K by using K-color toner. More specifically, the developer 203 first agitates dual-component developer DVL by using two auger screws 231, 232, resulting friction causing toner in the developer DVL to be negatively charged. The developer 203 then uses a developer roller 233 to convey the developer DVL to a nip between the developer roller 233 and the photoreceptor drum 24K. At the same time, the developer 203 applies a high negative voltage to the developer roller 233. As a result, a region of the electrostatic latent image having a lower charge amount than the developer roller 233 has a higher potential than the developer roller 233, and therefore an amount of toner corresponding to an amount of reduction in charge is separated from the developer carried by the developer roller 233 and attaches to the electrostatic latent image. In this way the electrostatic latent image is developed as a visible toner image.

Rotation of the photoreceptor drum 24K moves the toner image to the nip between the photoreceptor drum 24K and the primary transfer roller 22K. A positive high voltage is applied to the primary transfer roller 22K, and therefore the toner image, which is negatively charged, is transferred from the outer circumferential surface of the photoreceptor drum 24K to the intermediate transfer belt 21.

The cleaning blade 204 is a thin rectangular plate member made of, for example, a thermosetting resin such as polyurethane rubber. The cleaning blade 204 has a length that is substantially the same as a portion of the outer circumferential surface 241 of the photoreceptor drum 24K covered by the photoreceptor. A surface of the blade 204 facing the outer circumferential surface 241 of the photoreceptor drum 24K has one long edge parallel to the axis direction of the photoreceptor drum 24K and in contact with the outer circumferential surface 241, and scrapes off toner remaining after transfer of the toner image from the outer circumferential surface 241. In this way, the outer circumferential surface 241 is cleaned.

The eraser 205 irradiates the outer circumferential surface 241 of the photoreceptor drum 24K by using light from, for example, LEDs arranged along the axial direction of the photoreceptor drum 24K. Remaining electric charge disappears from a portion of the outer circumferential surface 241 irradiated with light. In this way, the outer circumferential surface 241 is neutralized.

[Print Head Configuration]

FIG. 2A is a perspective view of the print head 202, FIG. 2B is a cross section of the print head 202 taken along the straight line b-b shown in FIG. 2A, and FIG. 2C is a cross section of the print head 202 taken along the straight line c-c shown in FIG. 2A. The print head 202 is a light-emitting-element-array device and includes a light source panel 310, optical system arrays 321, 322, 323, and a holder 330.

—Light Source Panel—

The light source panel 310 is a light-transmissive glass substrate or resin substrate having an elongated rectangular shape (for example, a width of some centimeters, a length of some tens of centimeters, and a thickness of some hundreds of micrometers), and includes a light emission region 311, a sealing member 312, and an integrated circuit (IC) chip 313. The light emission region 311 is a region extending along almost the entire length of the light source panel 310 in a longitudinal direction thereof (X-axis direction in FIG. 2A, 2B, 2C). A plurality of solid state light emitting elements such as LEDs or OLEDs are provided directly on one surface 314 (in FIG. 2B, 2C, the lower surface, hereinafter also referred to as an "element surface") of the light emission region 311. As indicated by a thin solid line LRY in FIG. 2B, visible or infrared light generated by an element passes through the light source panel 310 to reach an opposite surface 315 (top surface in FIG. 2A, 2B, 2C, hereinafter also referred to as "emission surface") and is emitted in a normal direction therefrom (in FIG. 2A, 2B, 2C, a positive direction along the Z axis). The sealing member 312 is, for example, glass, or a multilayered structure of a metal oxide or nitride and a polymer. The sealing member 312 covers the element surface 314 of the light emission region 311 to hermetically isolate it from the outside. Thus, light emitting elements are protected from moisture and oxygen in external air. The IC chip 313 has a rectangular shape elongated in the longitudinal direction (X-axis direction) of the light source panel 310 and is mounted on the element surface 314 at one end in the longitudinal direction of the light source panel 310. The IC chip 313 incorporates a drive circuit for light emitting elements.

—Optical System Arrays—

The optical system arrays, as indicated in FIG. 2B, include three flat plate members 321, 322, 323 above the light source panel 310. Each of the flat plate members 321, 322, 323 has an elongated rectangular shape whose plate surface is substantially the same shape as a plate surface of the light source panel 310 and parallel thereto. The flat plate members 321, 322, 323 are disposed at intervals of, for example, a few centimeters, in a common normal direction (Z-axis direction in FIG. 2) to the plate surfaces from the light source panel 310. In particular, the longitudinal direction of the optical system arrays is parallel to the longitudinal direction (X-axis direction) of the light source panel 310. These flat plate members are, in order from the light source panel 310, a light-source-side lens array 321, an aperture array 322, and an image-side lens array 323.

The light-source-side lens array 321 and the image-side lens array 323 are each a light-transmissive glass or resin substrate (transmitting light emitted from the light source panel 310) having a thickness of some hundreds of micrometers, and the aperture array 322 is a non-light-transmissive resin substrate having a thickness of several to some tens of micrometers. The light-source-side lens array 321 includes microlenses 421, 422 on both upper and lower plate surfaces thereof, and the image-side lens array 323 includes microlenses 423 on only a lower plate surface thereof. Each of the microlenses 421, 422, 423 is, for example, a photocurable resin planoconvex lens having a circular circumference with a diameter of several hundreds of micrometers to some millimeters, having a planar side fixed to a plate surface of the lens array 321 or the lens array 323. The convex surface of each microlens is, for example, a portion of a spherical surface, and among microlenses 421, 422, 423 arranged on the same plate surface of the lens arrays 321, 323, shape of the convex surface is the same. The aperture array 322 includes diaphragm apertures 424 in its plate surfaces. The diaphragm apertures 424 are each circular, each having a diameter from several hundred micrometers to some millimeters. However, this diameter is smaller than the diameter common to the microlenses 421, 422, 423. The microlenses 421, 422, 423 and the diaphragm apertures 424 are all located in the same range as the light emission region 311 of the light source panel 310 (see FIG. 2B, 2C) in both the longitudinal direction (X-axis direction) common to the three optical system arrays 321, 322, 323 and a horizontal direction (Y-axis direction in FIG. 2A, 2B, 2C) perpendicular to the longitudinal direction, in the same matrices of rows and columns (in FIG. 2A, 2B, 2C, a two-dimensional oblique lattice with three rows and some hundreds of columns and a lattice spacing from several hundreds of micrometers to some millimeters). The microlenses 421, 422, 423 and diaphragm apertures 424 located at the same lattice point in their respective matrices share a center axis (optical axis LAX) normal to plate surfaces of the optical system arrays 321, 322, 323 (see FIG. 2B, 2C). That is, the microlenses 421, 422, 433 and diaphragm apertures 424 form optical systems (compound lenses). In this way, the optical system arrays 321, 322, 323 are an aggregate of a plurality of optical systems arranged in a matrix, sharing emitted light LRY from the light source panel 310 such that each optical system contributes to image forming on a different region of the outer circumferential surface of the photoreceptor drum 24K.

—Holder—

The holder 330 is a rectangular plate-like casing elongated in the longitudinal direction (X-axis direction) of the light source panel 310 and is made of resin, for example. The holder 330 includes an opening 331 in a plate surface (bottom surface in FIG. 2A, 2B, 2C) on one side and a slit 332 in a plate surface on the opposite side (top surface in FIG. 2A, 2B, 2C). The opening 331 and the slit 332 communicate with each other through an inner space. The holder 330 accommodates the light source panel 310 inside the opening 331 and holds the optical system arrays 321, 322, 323 inside the slit 332. An opening at an upper end of the slit 332 is closed with a light-transmissive plate 333 of glass or resin.

As illustrated in FIG. 2C, a bottom surface of the holder 330 is supported by a base member 400. The base member is made of a material having high rigidity, for example a sheet metal such as stainless steel. A top surface 401 of the base member 400 is a flat surface that is parallel to and facing the element surface 314 of the light source panel 310 at a defined distance from the light source panel 310. The top surface 401 supports both ends of the holder 330 at ends in the longitudinal direction (X-axis direction), and supports both edges of the holder 330 (not illustrated in FIG. 2C) at edges extending along the longitudinal direction (X-axis direction). The base member 400 is fixed to a chassis (not illustrated) of the printer 100 so that the longitudinal direction (X-axis direction) of the base member 400 is parallel to the axial direction of the photoreceptor drum 24K, i.e., parallel to the main scanning direction. Accordingly, the longitudinal direction in common between the holder 330 and the light source panel 310 and the optical system arrays 321, 322, 323 supported by the holder 330 is maintained parallel to the main scanning direction by the base member 400. The base member 400 includes two positioning members 412, 413. Each of the positioning members 412, 413 is a pin made of a material having high rigidity such as metal or hard resin, and penetrates through the top surface 401 of the base member 400 to protrude towards the light source panel 310 (in the positive direction of the Z axis). Tips of the positioning members 412, 413 are in contact with the sealing member 312 in the vicinity of the light emission region 311 of the light source panel 310. Position of the light source panel 310 with respect to the top surface 401, and in particular distances from the emission surface 315 of the light source panel 310 to the optical system arrays 321, 322, 323, are defined by projection length of the positioning members 412, 413.

[Light Emitting Element Configuration]

FIG. 3A is a partial exploded view diagram of the light source panel 310 and the three optical system arrays 321, 322, 323. On the element surface 314 (bottom surface in FIG. 3A) of the light source panel 310, a certain number of light emitting elements are formed in each small region SAR centered on an intersection CRS with the optical axis LAX of corresponding optical systems 421, 422, 423, 424 included in the optical system arrays 321, 322, 323. That is, on the element surface 314 of the light source panel 310, the small regions SAR, which each include a certain number of light emitting elements, form a matrix having the same form as the matrices of the optical systems 421, 422, 423, 424, i.e., a two-dimensional oblique lattice of three rows and some hundreds of columns. FIG. 3A includes an enlarged plan view of a small region SAR. In the small region SAR, light emitting elements 316 each having, for example, a rectangular shape with sides of several micrometers to some tens of micrometers are disposed regularly at intervals of some tens of micrometers (in FIG. 3A, a two-dimensional oblique lattice of three rows and three columns). Light emitted by light emitting elements 316 in the same small region SAR passes through the light source panel 310, radiates from the emission surface 315 (top surface in FIG. 3A), and irradiates the optical systems 421, 422, 423, 424 directly above the small region SAR.

FIG. 3B is a cross section diagram of a portion of the element surface 314 of the light source panel 310 that includes one light emitting element 316. The element surface 314 includes a plurality of conductive layers and insulating layers alternately laminated on a plate surface (bottom surface in FIG. 3B) of the light-transmissive substrate of the light source panel 310. Conductive layers constitute wiring connecting the light emitting element 316 to an external drive circuit. In particular, the light emitting element 316 is sandwiched between a light-transmissive electrode 317 made of a light-transmissive conductive material such as indium tin oxide (ITO) or indium zinc oxide (IZO) and a reflective electrode 318 made of a metal having high light reflectivity such as aluminum. The light emitting element 316 is an OLED and includes, for example, a hole injection layer, a hole transport layer, a light emitting layer, an electron transport layer, and an electron injection layer within a thickness of some hundreds of nanometers in this order from whichever of the light-transmissive electrode 317 and the reflective electrode 318 is an anode. According to a band structure formed between the light-transmissive electrode 317 and the reflective electrode 318, when a potential difference between the anode and cathode is greater than or equal to a threshold, holes from the anode and electrons from the cathode move to the light emitting layer and recombine with each other. Energy thereby emitted excites organic material in the light emitting layer, causing light emission. The larger the current flowing between the light-transmissive electrode 317 and the reflective electrode 318, the stronger the light LRY of the light emitting element 316. The light LRY is transmitted through the light-transmissive electrode 317, through a light-transmissive window 319 provided in a non-light-transmissive layer, through the light-transmissive substrate of the light source panel 310, and emitted from the emission surface 315.

[Optical System Configuration]

As illustrated in FIG. 3A, planar sides of the planoconvex microlenses 421, 422 are fixed to the top and bottom plate surfaces of the light-source-side lens array 321, and therefore each optical system light-source-side lens is equivalent to a thick biconvex lens. On the other hand, the planar sides of the planoconvex microlenses 423 are only fixed to the bottom plate surface of the image-side lens array 323, and therefore each optical system image-side lens is equivalent to a thick planoconvex lens.

Figure 4A:
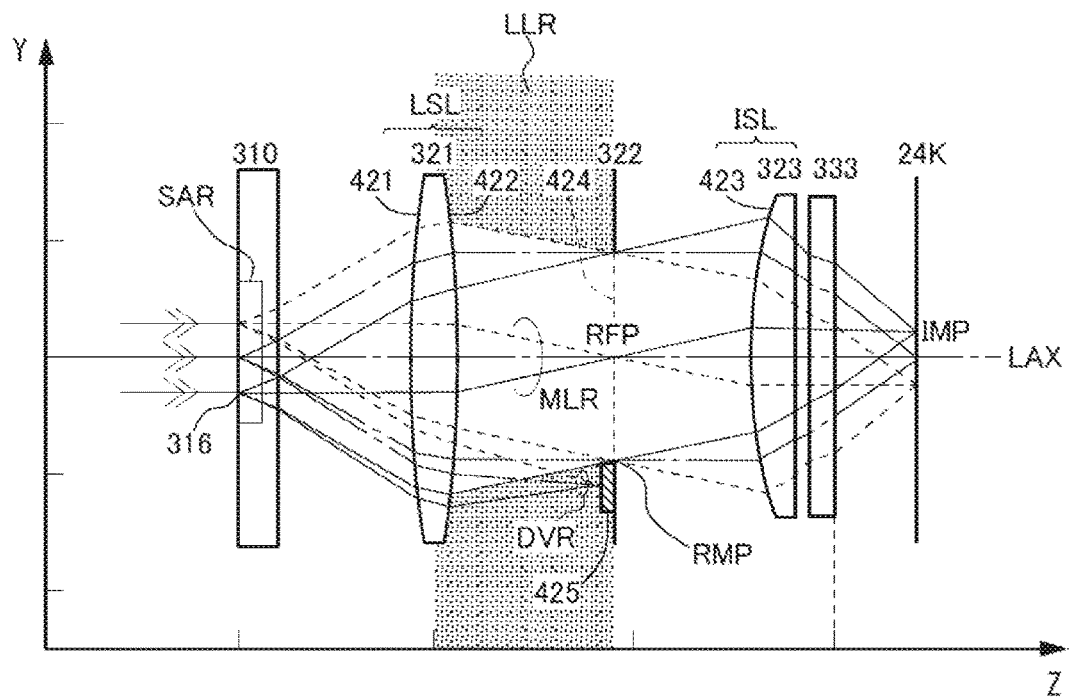
FIG. 4A is an optical arrangement diagram common to the optical systems illustrated in FIG. 3A.

FIG. 4A is an optical arrangement diagram of an optical arrangement common to the optical systems included in the optical system arrays 321, 322, 323. As illustrated in FIG. 4A, light emitted by one small region SAR of the light source panel 310 irradiates a light-source-side biconvex lens LSL from the light emission surface 315 of the light source panel 310. The light-source-side lens LSL represents a combination of the light-transmissive substrate of the light-source-side lens array 321 and a pair of top and bottom microlenses 421, 422. While proceeding towards the optical axis LAX, light transmitted through the light-source-side lens LSL arrives at the aperture array 322. Of this light, a portion passing through the diaphragm aperture 424 centered on the optical axis LAX irradiates the convex surface of the image-side planoconvex lens ISL, and a portion that misses the diaphragm aperture 424 is intercepted by the surface of the diaphragm. The image-side lens ISL represents a combination of the light-transmissive substrate of the image-side lens array 323 and the microlens 423. Light transmitted through the image-side lens ISL is transmitted through the light-transmissive substrate 333 to form an image on the surface of the photoreceptor drum 24K.

In the optical arrangement illustrated in FIG. 4A, the combination of the light-source-side lens LSL and the diaphragm aperture 424 constitutes an object-side telecentric optical system. The term "object-side telecentric optical system" means an optical system in which an entrance pupil is positioned at infinity, that is, an optical system in which a diaphragm is disposed to a rear-side focal point of a curved mirror or lens on which light from a subject is incident. In FIG. 4A, a rear focal point RFP of the light-source-side lens LSL is at a center of the diaphragm aperture 424. In this optical arrangement, emitted light parallel to the optical axis LAX from any light emitting element 316 in the same small region SAR of the light source panel 310 becomes part of a main light ray MLR (ray passing through the center RFP of the diaphragm aperture 424). Accordingly, even if distance to the surface of the photoreceptor drum 24K in the direction of the optical axis LAX varies among the light emitting elements 316, the optical system ensures that distance from the optical axis LAX does not vary for an image point IMP of each of the light emitting elements 316.

In the optical arrangement illustrated in FIG. 4A, the combination of the diaphragm aperture 424 and the image-side lens ISL may constitute an image-side telecentric optical system. The term "image-side telecentric optical system" means an optical system in which an exit pupil is positioned at infinity, that is, an optical system in which a diaphragm is disposed to a front-side of focal point of a curved mirror or lens on which light from a subject is incident. In FIG. 4A, the center RFP of the diaphragm aperture 424 is also coincident with the front focal point of the image-side lens ISL. In this optical arrangement, the main light ray MRP (ray passing through the center RFP of the diaphragm aperture 424) from any light emitting element 316 in the same small region SAR of the light source panel 310 also irradiates the surface of the photoreceptor drum 24K as a light ray parallel to the optical axis LAX. Accordingly, even if distance from the light source panel 310 to the surface of the photoreceptor drum 24K in the direction of the optical axis LAX varies due to vibration of the photoreceptor drum 24K or the like, the optical system ensures that distance from the optical axis LAX does not vary for the image point IMP of each of the light emitting elements 316.

[Light Receiving Element Configuration]

As illustrated in FIG. 3A, the light receiving elements 425 are each embedded at a portion of the edge of one of the diaphragm apertures 424 in a surface of the aperture array 322 facing the light-source-side lens array 321 (bottom surface in FIG. 3A). The light receiving element 425 includes, for example, a rectangular light receiving surface having a side from several tens of micrometers to some hundreds of micrometers in length. FIG. 3C is a cross section of the light receiving element 425. The receiving element 425 is a photo diode, and includes a semiconductor substrate 426, a P-type region 427, an N+-type region 428, an anode 429, and a cathode 430. The semiconductor substrate 426 is an intrinsic semiconductor such as silicon (Si) or an N-type semiconductor substrate doped with a donor such as phosphorus (P). The P-type region 427 is a region extending inward from a light receiving surface 431 (in FIG. 3C, the bottom surface) of the semiconductor substrate 426 and is doped with an acceptor such as boron (B). The N+-type region 428 is a region extending inward from the plate surface of the semiconductor substrate 426 opposite the light receiving surface 431 and has a higher concentration of a donor such as phosphorus (P) than other regions of the semiconductor substrate 426. The anode 429 is a conductive film deposited on the light receiving surface 431 and is used as wiring connecting the P-type region 427 to an external electronic circuit. The cathode 430 is a conductive film deposited to cover the plate surface of the semiconductor substrate 426 opposite the light receiving surface 431 and is used as wiring connecting the N+-type region 428 to an external electronic circuit.

In the semiconductor substrate 426, a depletion layer 432 occurs outside the P-type region 427. When the semiconductor substrate 426 is an intrinsic semiconductor, the depletion layer 432 further expands due to a reverse voltage applied between the anode 429 and the cathode 430. When light from the light emitting element 316 enters the depletion layer 432, pairs of holes and electrons are generated, holes moving to the anode 429 and electrons moving to the cathode 430. This movement is detected as current by an external electronic circuit. The larger the amount of light incident on the depletion layer 432, the larger the number of hole-electron pairs, and therefore the larger the amount of current detected.

In FIG. 4A, the light receiving elements 425 include their respective light receiving surfaces at portions of the edges of the diaphragm apertures 424, and detect the amounts of light incident on the light receiving surfaces. Thus, the light receiving surfaces of the light receiving elements 425 are disposed in leaked light regions LLR, which are occupied by optical paths of light transmitted through the light-source-side lenses LSL but not through the diaphragm apertures 424, i.e., not incident on the image-side lenses ISL (see the dotted region indicated in FIG. 4A). As a result, the light receiving elements 425 detect portions DVR of light deviating into the leaked light regions LLR out of light emitted from the small regions SAR of the light source panel 310. The light amount of the portions DVR is sufficiently larger in amount than light deviating from the light-source-side lenses LSL and sufficiently larger in amount than light reflected from the light-source-side lenses LSL or the like and returning to the light source panel 310. Further, the optical paths from the small regions SAR to the edges of the diaphragm apertures 424 are longer than optical paths from the small regions SAR to the outside of the light-source-side lenses LSL and longer than optical paths of light reflected from the light-source-side lenses LSL or elsewhere and returning the light source panel 310. Accordingly, even if there is variation in position in the direction of the optical axis LAX between the light emitting elements 316 in the same small regions SAR of the light source panel 310, the optical paths from the small regions SAR to the light receiving elements 425 are designed to be long enough that the variation is negligible, while maintaining sufficiently large amounts of detectable light at the light receiving elements 425.

In the optical arrangement illustrated in FIG. 4A, each pair of the light-source-side lenses LSL and the diaphragm apertures 424 further constitutes an object-side telecentric optical system. In this case, even if there is variation in position in the direction of the optical axis LAX between the light emitting elements 316, optical path lengths up to the edges RMP of the diaphragm apertures 424 are theoretically equal. Accordingly, by making the light receiving surfaces of the light receiving elements 425 sufficiently close to the edges RMP of the diaphragm apertures 424, variation in optical path length to the light receiving surfaces is kept sufficiently small.

As a result, the light receiving element 425 disposed in the leaked light region LLR has a signal-to-noise ratio (S/N ratio) higher than that of a conventional light receiving element disposed outside the light-source-side lens LSL or on the light source panel 310. That is, error due to variation in positions between the light emitting elements 316 is sufficiently small with respect to light amounts detected by the light receiving element.

[Electronic Circuit System for Light Source Control]

Figure 4B:
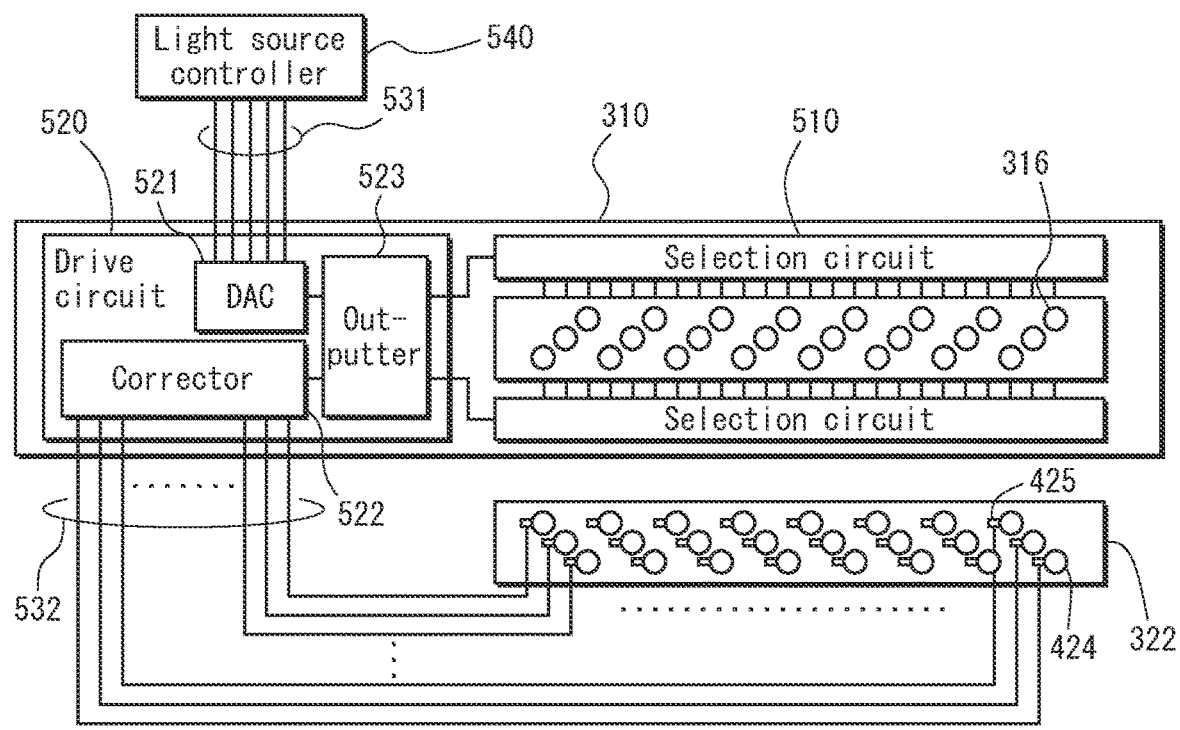
FIG. 4B is a block diagram of an electronic circuit system for controlling the light emitting elements illustrated in FIG. 3A.

FIG. 4B is a block diagram of an electronic circuit system for controlling the light emitting elements 316. This system includes selection circuits 510 and a drive circuit 520 in addition to the light emitting elements 316 and the light receiving elements 425. The selection circuits 510 are thin-film-transistor (TFT) circuits formed directly on a surface of the light source panel 310, and connect the light emitting elements 316 in order to the drive circuit 520. The drive circuit 520 is an application-specific integrated circuit (ASIC) or field-programmable-gate array (FPGA), and embedded in an IC chip 313 (see FIG. 2C) directly mounted on a surface of the light source panel 310 (chip on glass (COG)). The drive circuit 520 includes a digital-analog converter (DAC) 521, a corrector 522, and an outputter 523.

The DAC 521 is connected to a light source controller 540 in the printer 100 via a flexible-printed-circuit (FPC) substrate 531, and receives digital image data from the light source controller 540. The image data is converted to an analog luminance signal by the DAC 521 and sent to the outputter 523.

The corrector 522 periodically updates a correction value of a light emission amount of each of the light emitting elements 316, for example during startup processing performed immediately after power supply of the printer 100 is switched on or during image stabilization. Specifically, the corrector 522 collects a current signal from each of the light receiving elements 425 via wiring 532 that includes a conductive layer of the aperture array 322 and cables installed in the holder 330. The level of each current signal represents the amount of received light detected by the light receiving element 425 of the transmission source. Based on the amount of received light, the corrector 522 estimates a total amount of light emitted from each of the light emitting elements 316, calculates a correction value of the light emission amount from the difference between the estimated and target values, and transmits the correction value to the outputter 523.

The outputter 523 adds or subtracts an amount of current corresponding to a level of a luminance signal received from the DAC 521, based on the correction value received from the corrector 522. For example, when the correction value represents an amplification factor (gain) of current, the outputter 523 amplifies the current amount corresponding to the level of the luminance signal by a gain equivalent to the correction value, and supplies the amplified current amount to the light emitting element 316 connected via the selection circuit 510.

In a typical exposure operation, for example, the selection circuit 510 connects the light emitting elements 316 of the light source panel 310 column by column in the main scanning direction to the drive circuit 520, and the drive circuit 520 causes the light emitting elements of one column to simultaneously emit light. Due to the selection circuit 510 switching between light emitting element columns to be connected to the drive circuit 520 in sub-scanning direction order, the columns emit light in this order.

In an operation updating the correction values of light emission amounts, for example, the selection circuits 510 select one of the light emitting elements 316 of the light source panel 310 located at the same lattice point in each of the small regions SAR, simultaneously connect them to the drive circuit 520, and the drive circuit 520 causes the selected light emitting elements 316 to emit light at the same time. The selection circuits 510 switch the light emitting elements to be connected to the drive circuit 520 in an order of arrangement of the light emitting elements in the small regions SAR so that the light emitting elements 316 in each of the small regions SAR emit light one by one in the order of arrangement. One of the light receiving elements 425 is provided for each of the small regions SAR, and therefore the corrector 522 can calculate in parallel correction values of light amounts for the same number of light emitting elements as the total number of the small regions SAR.

Merits of Embodiments

In the printer 100 according to an embodiment of the present invention, each optical system is a compound lens including the light-source-side lens LSL and the image-side lens ISL, which, together with the aperture array 322 disposed in the gap between both the lenses, forms the object- and image-side telecentric optical system. Accordingly, even if there is variation in distance to the surface of the photoreceptor drum 24K in the direction of the optical axis LAX among the light emitting elements 316 of the small region SAR of the light source panel 310, and even if there is a change in distance from the light source panel 310 to the surface of the photoreceptor drum 24K in the direction of the optical axis LAX due to vibration of the photoreceptor drum 24K or the like, distance from the optical axis LAX of the image point IMP of each of the light emitting elements 316 formed by the optical systems does not change. Thus, the print head 202 reduces distortion of electrostatic latent images formed on the surfaces of the photoreceptor drums 24Y, 24M, 24C, 24K; the distortion may occur due to individual differences between the light emitting elements 316 and disturbances caused by vibration in the light source panel 310 and/or the photoreceptor drums 24Y, 24M, 24C, 24K. Reduction of the distortion is advantageous for increasing image quality of the printer 100.

In the print head 202 as described above, the light receiving elements 425 are disposed in one-to-one correspondence with the edges of the diaphragm apertures 424 and each detects the portion DVR of light deviating to the leaked light region LLR from light emitted from one small region SAR of the light source panel 310 and transmitted through the light-source-side lens LSL. This portion DVR of light is more intense and has a longer optical path than light leaked outside the light-source-side lens LSL and is more intense and has a longer optical path than light returning to the light source panel 310. Accordingly, even if there is variation in position in the direction of the optical axis LAX between the light emitting elements 316, the optical path from the small region SAR to the light receiving element 425 is designed to be long enough that the variation is negligible, while maintaining a sufficiently large amount of detectable light at the light receiving element 425. Further, the combination of the light-source-side lens LSL and the diaphragm aperture 424 is the object-side telecentric optical system, and therefore variation between the light emitting elements 316 of optical path length to light receiving surfaces of the light receiving elements 425 is sufficiently small. As a result, the light receiving elements 425 disposed in the leaked light region LLR have signal-to-noise ratios higher than that of conventional light receiving elements disposed outside the light-source-side lens LSL or on the light source panel 310. In this way, the print head 202 can further improve accuracy of calibration of light emission amounts by using the light receiving elements 425, regardless of individual differences between the light emitting elements 316.

[Modifications]

(A) The image forming device 100 illustrated in FIG. 1A, 1B, 1C is an intermediate transfer type of color printer including the tandem-type photoreceptor units 20Y, 20M, 20C, 20K and the intermediate transfer belt 21. As other examples, an image forming device pertaining to an embodiment of the present invention may be a direct transfer type of color printer, a monochrome printer, a facsimile machine, a copier, or a multi-function peripheral (MFP).

(B) Configuration of the photoreceptor unit 20K illustrated in FIG. 1C is merely one example. For another example, instead of the corona discharge type of the charger 201 that uses the electrode 211, a charger may be a proximity discharge type using a roller or the like. Further, the eraser 205 may be closer to the primary transfer roller 22K than the cleaning blade 204.

(C) In FIG. 1C, the outer circumferential surface 241 of the drum 24K is covered by photoreceptor. Instead of the drum 24K, an outer circumferential surface of a belt may be covered by photoreceptor. Such a belt, similarly to the drum 24K, is disposed surrounded by a charger, a developer, a cleaning blade, and an eraser. In one rotation of the belt, each surface portion of receptor receives charging, exposure, developing, transfer, cleaning, and neutralization in order from these processing elements.

(D) In the light source panel 310 and the optical system arrays 321, 322, 323, 324 illustrated in FIG. 2A, 2B, 2C, the matrix of the small regions SAR, the matrices of the microlenses 421, 422, 423, and the matrix of the diaphragm apertures 424 are each two-dimensional oblique lattices having three rows and some hundred columns. Size (row length, column length, and spacing) of these matrices can be freely changed, and the matrices may be square lattices. Similarly, in each of the small regions SAR of the light source panel 310, the light emitting elements 316 may be arrayed in oblique lattice patterns or square lattice patterns that differ in size (row length, column length, and spacing) from the two-dimensional oblique lattice of three rows and three columns illustrated in FIG. 3A.

(E) In the double-lens array 321, 323 illustrated in FIG. 2A, 2B, 2C, convex surfaces of the microlenses 421, 422, 423 are spherical. The convex surfaces may be aspherical. Further, the light-source-side lens array may be planoconvex, including microlenses on only one side, and the image-side lens array may be biconvex, including microlenses on both sides. Further, there may be three or more lens arrays, and each optical system may be a compound lens including three or more lenses. A concave lens may be included in each compound lens. In each case, it suffices if the light receiving surfaces of the light receiving elements are disposed in the leaked light region in the gap between the light-source-side lens and the image-side lens.

(F) In the optical arrangement illustrated in FIG. 4A, the combination of the light-source-side lens LSL and the diaphragm aperture 424 constitutes an object-side telecentric optical system. That is, the rear focal point RFP of the light-source-side lens LSL is at the center of the diaphragm aperture 424. Each optical system is not limited to this arrangement, and it is sufficient that the light-source-side lens array 321 and the image-side lens array 323 are opposed across a gap, with a light receiving element disposed in the gap. In this case, light detected by the light receiving element is more intense and has a longer optical path than light leaked outside the light-source-side lens and is more intense and has a longer optical path than light returning to the light source panel. Accordingly, even if there is variation in position in the direction of the optical axis between light emitting elements, the optical path from the light emitting elements to the light receiving elements can be designed to be long enough that the variation is negligible, while maintaining a sufficiently large amount of detectable light at the light receiving element.

(G) In FIG. 3A, 3C, 4A, 4B, the light receiving surfaces of the light receiving elements 425 are arranged in one-to-one correspondence with portions of the edges of the diaphragm apertures 424. In particular, as illustrated in FIG. 3C, the semiconductor substrate 426 of the light receiving element 425 is embedded in the aperture array 322.

Alternatively, a rectangular notch may be provided at a portion of the edge of each of the diaphragm apertures 424, and the light receiving elements may be arranged so that their light receiving surfaces close the notches from the image side. That is, the light receiving elements detect, from light transmitted through the light-source-side lenses LSL, portions of light that fall outside the diaphragm apertures 424 but pass through the notches. Even in this case, the light receiving elements are arranged in the gap between the light-source-side lenses LSL and the object-side lenses ISL in the leaked light regions LLR, which are occupied by optical paths of the light transmitted through the light-source-side lenses LSL but not incident on the image-side lenses ISL.

Figure 5A:
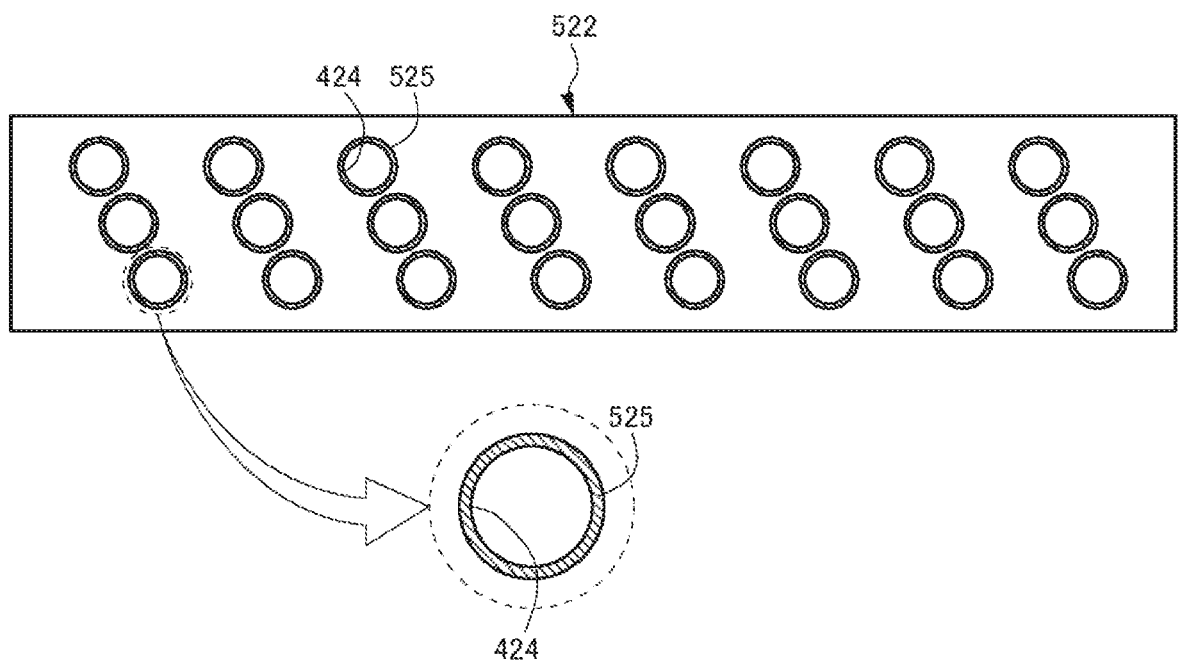
FIG. 5A is a plan view of an aperture array in which a light receiving surface of a light receiving element is disposed on a circular ring surrounding the entirety of the edge of each aperture.

Light receiving elements may each be arranged around the entirety of an edge of a single one of the diaphragm apertures 424, and are not limited to a specific portion of the edge. FIG. 5A is a plan view of an aperture array 522 in which light receiving surfaces of light receiving elements are disposed on annular surfaces 545 surrounding the diaphragm apertures 424. In this first case, the entirety of each of the annular surfaces 545 may be the light receiving surface of a single light receiving element. That is, the semiconductor substrate 426 illustrated in FIG. 3C may be embedded in the entirety of each of the annular surfaces 545, and the P-type region 427 may extend inward from the entirety of each of the annular surfaces 545. Alternatively, a plurality of light receiving elements having light receiving surfaces sufficiently smaller than the annular surfaces 525 may be arranged in a circle shape around the edge of the diaphragm aperture 424. Further, instead of the annular surfaces 545 of the aperture array 322, the light receiving surfaces of the light receiving elements may be disposed on other annular surfaces in the leaked light region LLR so as to surround optical paths of light incident on the object-side lenses ISL; the other annular surfaces are located in the gap between the light-source-side lenses LSL and the object-side lenses ISL illustrated in FIG. 4A, at a position nearer the light-source-side lenses LSL than the aperture array 322. In this second case, the entirety of each annular surface may be the light receiving surface of a single light receiving element, or a plurality of light receiving elements having light receiving surfaces sufficiently smaller than the annular surfaces may be arranged in a circle around the circumference of the annular surface. In both the first and second cases, light amounts detected by the light receiving elements account for a large portion of light deviated to the leaked light region LLR, and therefore the light receiving elements have high signal-to-noise ratios. As a result, highly accurate estimates of total amounts of light emitted from the light emitting elements 316 are estimated from light amounts detected by the light receiving elements.

(H) In the aperture array 322 illustrated in FIG. 3A, each of the light receiving elements 425 is embedded at the edge of one of the diaphragm apertures 424. Accordingly, each of the light receiving elements 425 detects light from a certain number of the light emitting elements 316 included in one of the small regions SAR and transmitted through the same pair of the light-source-side microlenses 421, 422. That is, the light receiving elements 425 correspond one-to-one with the optical systems. Alternatively, one light receiving element may be provided per group of adjacent optical systems.

Figure 5B:
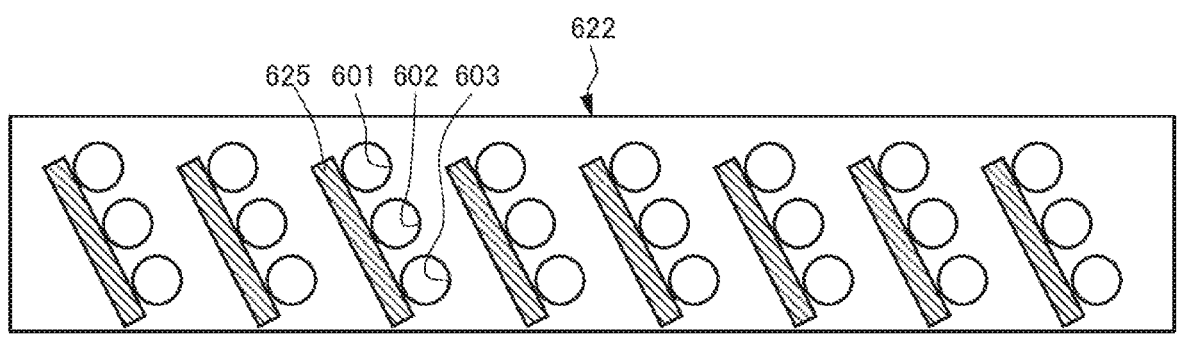
FIG. 5B is a plan view of an aperture array in which light receiving elements are provided in one-to-one correspondence with each column of apertures.

FIG. 5B is a plan view of an aperture array 622 in which one light receiving element is provided per column of three adjacent diaphragm apertures, i.e., diaphragm apertures 601, 602, 603. Columns of the diaphragm apertures 601, 602, 603 are lined up along the longitudinal direction of the aperture array 622, i.e., the main scanning direction (horizontal direction in FIG. 5B), each column being inclined at an oblique angle with respect to the main scanning direction (slanted to the left in FIG. 5B). One light receiving element 625 is disposed next to each column of the diaphragm apertures 601, 602, 603. An elongated rectangular light receiving surface of the light receiving element 625 crosses the aperture array 622 such that a long edge of the light receiving surface coincides with a common tangent line of edges of the three diaphragm apertures 601, 602, 603. Accordingly, the light receiving element 625 detects a portion of leaked light that deviates from any of the diaphragm apertures 601, 602, 603.

The arrangement illustrated in FIG. 5B in which one light receiving element 625 is provided per three diaphragm apertures requires less mounting surface area and parts of wiring for connection to the corrector 522 than the arrangement illustrated in FIG. 4B in which one light receiving element 425 is provided per diaphragm aperture. This is advantageous in simplifying the manufacturing process of the print head 202 and reducing the manufacturing cost thereof.

The process of updating correction values of light emission amounts is performed as follows. For example, the selection circuits 510 select among the light emitting elements 316 of the light source panel 310 one light emitting element per column of three adjacent small regions SAR, and simultaneously connect all the selected light emitting elements to the drive circuit 520. The drive circuit 520 causes the selected light emitting elements to emit light at the same time. Thus, light from different light emitting elements is detected by different light receiving elements 625. The selection circuits 510 switch the light emitting elements to be connected to the drive circuit 520 for each column of the small regions SAR in order so that the light emitting elements 316 in each column of the small regions SAR emit light one by one in the order selected. As a result, the corrector 522 can calculate in parallel the correction values of light amounts of light emitting elements equal in number to columns of the small regions SAR.

[Supplement]

Based on the embodiments described above, the invention may be further characterized as follows.

Each of the optical systems may further include a diaphragm disposed in the gap between the light-source-side lens and the image-side lens. The diaphragm intercepts a portion of light transmitted through the light-source-side lens in order to restrict light incident on the image-side lens and including an aperture, an edge of which overlaps with the light receiving surface of a corresponding one of the light receiving elements. The optical systems may be telecentric on their light-source side due to location of the diaphragms at the rear focal points of the light-source-side lenses of the optical systems.

The light receiving elements may correspond one-to-one with the optical systems. Each of the light receiving surfaces of the light receiving elements, in the leaked light region in the gap between the light-source-side lens and the image-side lens, may be an annular surface that surrounds optical paths of light incident on the image-side lens. Each of the light receiving elements may correspond to a group of the optical systems that are adjacent to each other, and in this case, for each of the light receiving elements, the light receiving surface thereof traverses the leaked light regions of the optical systems of the corresponding group. The light emitting elements may include organic light emitting diodes.

Although one or more embodiments of the present invention have been described and illustrated in detail, the disclosed embodiments are made for the purposes of illustration and example only and not limitation. The scope of the present invention should be interpreted by the terms of the appended claims.

What is claimed is:

1. A print head for writing data onto a photoreceptor by using modulated light, the print head comprising:
   a light source panel including light emitting elements arranged in a matrix;
   an optical system array that is an aggregate of optical systems arranged in a matrix shape matched up with the matrix of the light emitting elements, the optical systems each including at least a light-source-side lens and an image-side lens, and the optical systems focusing light from the light emitting elements onto different regions of the photoreceptor; and
   a driver that modifies light emission amounts of each of the light emitting elements according to the data to be written, the driver including:
   light receiving elements each including a light receiving surface disposed in a leaked light region and detecting an amount of light incident on the light receiving surface, the leaked light region being in a gap between the light-source-side lens and the image-side lens of each of the optical systems and occupied by optical paths of light transmitted through the light-source-side lenses but not incident on the image-side lenses; and
   a corrector that corrects the amounts of light to be emitted from the light emitting elements based on the amounts of light detected by the light receiving elements.

2. The print head according to claim 1, wherein
   each of the optical systems further includes a diaphragm disposed in the gap between the light-source-side lens and the image-side lens, the diaphragm intercepting a portion of light transmitted through the light-source-side lens in order to restrict light incident on the image-side lens and including an aperture, an edge of which overlaps with the light receiving surface of a corresponding one of the light receiving elements.

3. The print head according to claim 2, wherein
   the optical systems are telecentric on their light-source side due to location of the diaphragms at the rear focal points of the light-source-side lenses of the optical systems.

4. The print head according to claim 1, wherein
   each of the light receiving elements corresponds to a group of the optical systems that are adjacent to each other, and for each of the light receiving elements the light receiving surface thereof traverses the leaked light regions of the optical systems of the corresponding group.

5. The print head according to claim 1, wherein
   the light emitting elements include organic light emitting diodes.

6. A print head for writing data onto a photoreceptor by using modulated light, the print head comprising:
   a light source panel including light emitting elements arranged in a matrix;
   an optical system array that is an aggregate of optical systems arranged in a matrix shape matched up with the matrix of the light emitting elements, the optical systems each including at least a light-source-side lens and an image-side lens, and the optical systems focusing light from the light emitting elements onto different regions of the photoreceptor; and
   a driver that modifies light emission amounts of each of the light emitting elements according to the data to be written, the driver including:

light receiving elements each including a light receiving surface disposed in a leaked light region and detecting an amount of light incident on the light receiving surface, the leaked light region being in a gap between the light-source-side lens and the image-side lens of each of the optical systems and occupied by optical paths of light transmitted through the light-source-side lenses but not incident on the image-side lenses; and a corrector that corrects the amounts of light to be emitted from the light emitting elements based on the amounts of light detected by the light receiving elements;

wherein the light receiving elements correspond one-to-one with the optical systems.

7. The print head according to claim 6, wherein each of the light receiving surfaces of the light receiving elements, in the leaked light region in the gap between the light-source-side lens and the image-side lens, is an annular surface that surrounds optical paths of light incident on the image-side lens.

8. An electrophotographic image forming device comprising:

a photoreceptor;

a print head that exposes a surface of the photoreceptor to a light beam to form an electrostatic latent image on the surface;

a developer that develops the electrostatic latent image to a visible image by using toner; and a transfer device that transfers the visible image developed by the developer from the photoreceptor to a sheet, the print head comprising:

a light source panel including light emitting elements arranged in a matrix;

an optical system array that is an aggregate of optical systems arranged in a matrix shape matched up with the matrix of the light emitting elements, the optical systems each including at least a light-source-side lens and an image-side lens and the optical systems focusing light from the light emitting elements onto different regions of the photoreceptor; and a driver that modifies light emission amounts of each of the light emitting elements according to the data to be written, the driver including:

light receiving elements each including a light receiving surface disposed in a leaked light region and detecting an amount of light incident on the light receiving surface, the leaked light region being in a gap between the light-source-side lens and the image-side lens of the optical systems and occupied by optical paths of light transmitted through the light-source-side lenses but not incident on the image-side lenses; and a corrector that corrects the amounts of light to be emitted from the light emitting elements based on the amounts of light detected by the light receiving elements.

9. The electrophotographic image forming device according to claim 8, wherein the light receiving elements correspond one-to-one with the optical systems.

* * * * *